(12) United States Patent  
McCarrell (10) Patent No.: US 7,475,563 B2  
(45) Date of Patent: Jan. 13, 2009

(54) MULTIFUNCTION COOLER

(76) Inventor: Billy Ray McCarrell, 743 County Rd. 2133, P.O. Box 1114, Valley View, TX (US) 76272-4909

( * ) Notice: Subject to any disclaimer, the term of this patent is extended or adjusted under 35 U.S.C. 154(b) by 140 days.

(21) Appl. No.: 11/510,375

(22) Filed: Aug. 25, 2006

(65) Prior Publication Data

US 2007/0044503 A1    Mar. 1, 2007

Related U.S. Application Data

(60) Provisional application No. 60/711,268, filed on Aug. 25, 2005.

(51) Int. Cl.  
*F25D 3/02* (2006.01)

(52) U.S. Cl. ...................................................... 62/420

(58) Field of Classification Search ................. 62/259.3, 62/420, 425  
See application file for complete search history.

(56) References Cited

U.S. PATENT DOCUMENTS 5,953,933 A * 9/1999 Cheng .......................... 62/425  
6,571,568 B1 * 6/2003 Link ............................ 62/244

* cited by examiner

*Primary Examiner*—Melvin Jones  
(74) *Attorney, Agent, or Firm*—Kevin Mark Klughart

(57) ABSTRACT

A MULTIFUNCTION COOLER is disclosed that permits a single portable cooler to simultaneously operate as a conventional portable refrigeration device, a personal air conditioner, and a portable air inflation device. The disclosed cooler incorporates an air injection port that permits warm air external to the cooler to be forced through ice or other coolant material inside the cooler. The air injection is facilitated by an electric air blower or other fan apparatus which vents air from within the coldest portions of the interior of the cooler confines to an exhaust port which may be used as a source of air conditioning or alternatively as an air inflation device.

6 Claims, 6 Drawing Sheets

MULTIFUNCTION COOLER

CROSS REFERENCE TO RELATED APPLICATIONS

Applicant claims benefit pursuant to 35 U.S.C. § 119 and hereby incorporates by reference Provisional Patent Application for "MULTIFUNCTION COOLER", Ser. No. 60/711,268, filed Aug. 25, 2005, and submitted to the USPTO with Express Mail on Aug. 25, 2005 with tracking number ER618466134US.

PARTIAL WAIVER OF COPYRIGHT

All of the material in this patent application is subject to copyright protection under the copyright laws of the United States and of other countries. As of the first effective filing date of the present application, this material is protected as unpublished material.

However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO A MICROFICHE APPENDIX

Not Applicable

FIELD OF THE INVENTION

The present invention is related to portable recreational coolers. Generally, the field consists of a cooler body and cooler lid formed of insulating material or various types of thermoplastic. These are useful in transporting ice or other cooling material for the purposes of cooling drinks or providing refrigeration of foodstuffs.

The field generally does not address the use of coolers as multifunction devices. The present invention integrates the functionality of a conventional portable recreational cooler and that of a portable air conditioner and a portable air inflation device.

OBJECTIVES OF THE INVENTION

Accordingly, the objectives of the present invention are (among others) to circumvent the deficiencies in the prior art and affect the following objectives:
 (1) To provide a multifunction cooler that can function as a conventional cooler for the purpose of refrigerating foodstuffs and/or drinks.
 (2) To provide a multifunction cooler that can be used as a portable air conditioner.
 (3) To provide a multifunction cooler that can be used as a personal portable air conditioning device, suitable for use with special purpose articles of clothing and/or furniture designed specifically for personal cooling and body temperature control.
 (4) To provide a multifunction cooler that can be used as a portable air filter.
 (5) To provide a multifunction cooler that can be used as a portable air inflation device.
 (6) To provide a multifunction cooler that can simultaneously operate as a foodstuff cooler and/or a portable air conditioner and/or air inflation device.

While these objectives should not be understood to limit the teachings of the present invention, in general these objectives are achieved in part or in whole by the disclosed invention that is discussed in the following sections. One skilled in the art will no doubt be able to select aspects of the present invention as disclosed to affect any combination of the objectives described above.

BRIEF SUMMARY OF THE INVENTION

Figure 1:
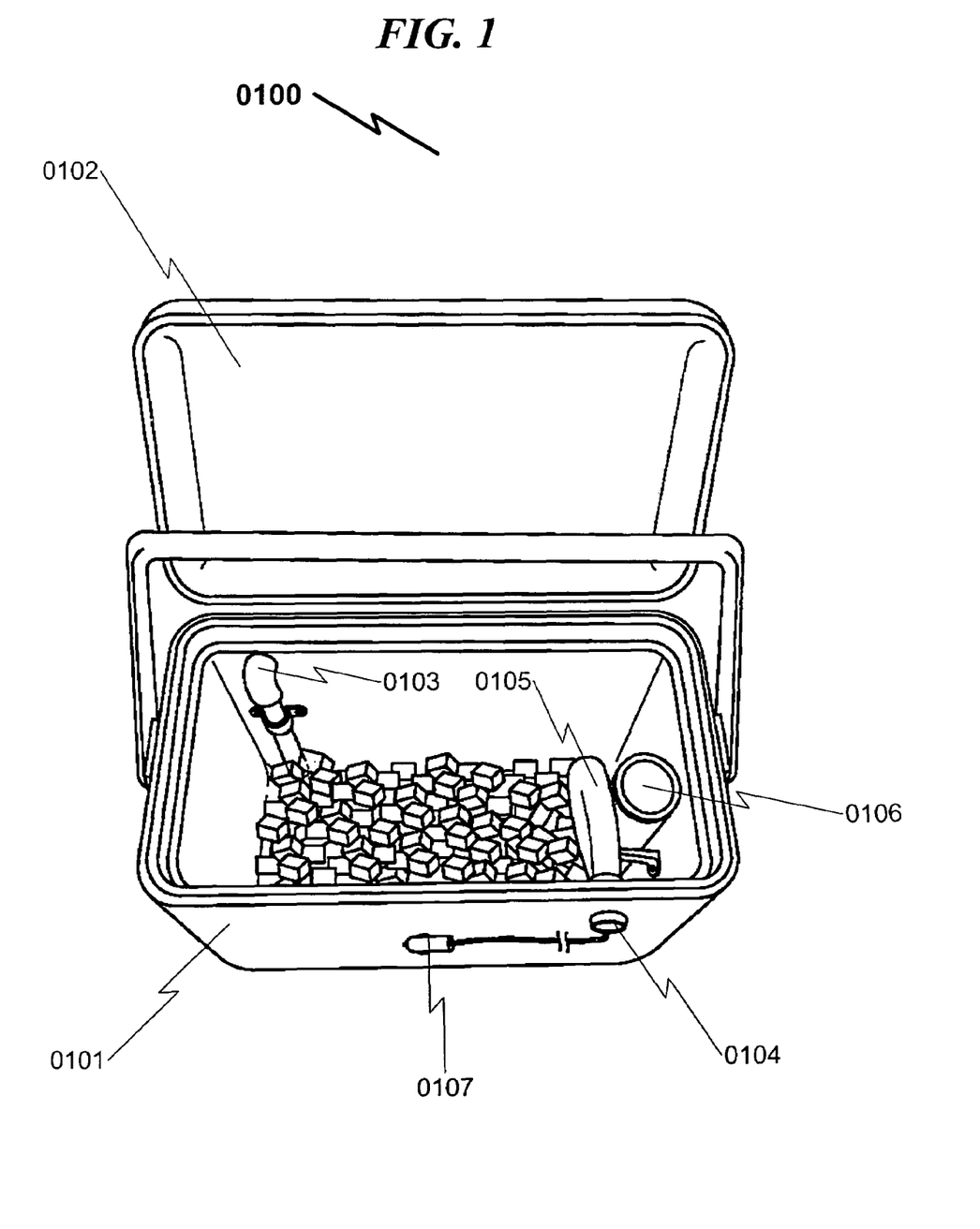
FIG. 1 illustrates an exemplary embodiment of the present invention incorporating a cooler body (0101), cooler lid (0102), air injection port (0103), air exhaust port (0104), and electric blower motor (0105)

The present invention is generally illustrated in FIGS. 1-6 (0100, 0200, 0300, 0400, 0500, 0600) and comprises the following items as generally illustrated in FIG. 1 (0100):
 Cooler body (0101);
 Cooler lid (0102) which may in some configurations be optionally attached to the cooler body (0101);
 Air injection port (0103);
 Air exhaust port (0104);
 Electric blower motor (0105);
 Air intake for electric blower motor (0106).

While a variety of electric blower motors may be utilized, some preferred embodiments of the present invention make use of a power cord (0107) which may be configured with a conventional automobile cigarette lighter adapter as illustrated in FIG. 1. This power cord may be directed through the body of the cooler or in some configurations there may be an electrical plug/connector arrangement placed on the side of the cooler for this purpose.

Figure 2:
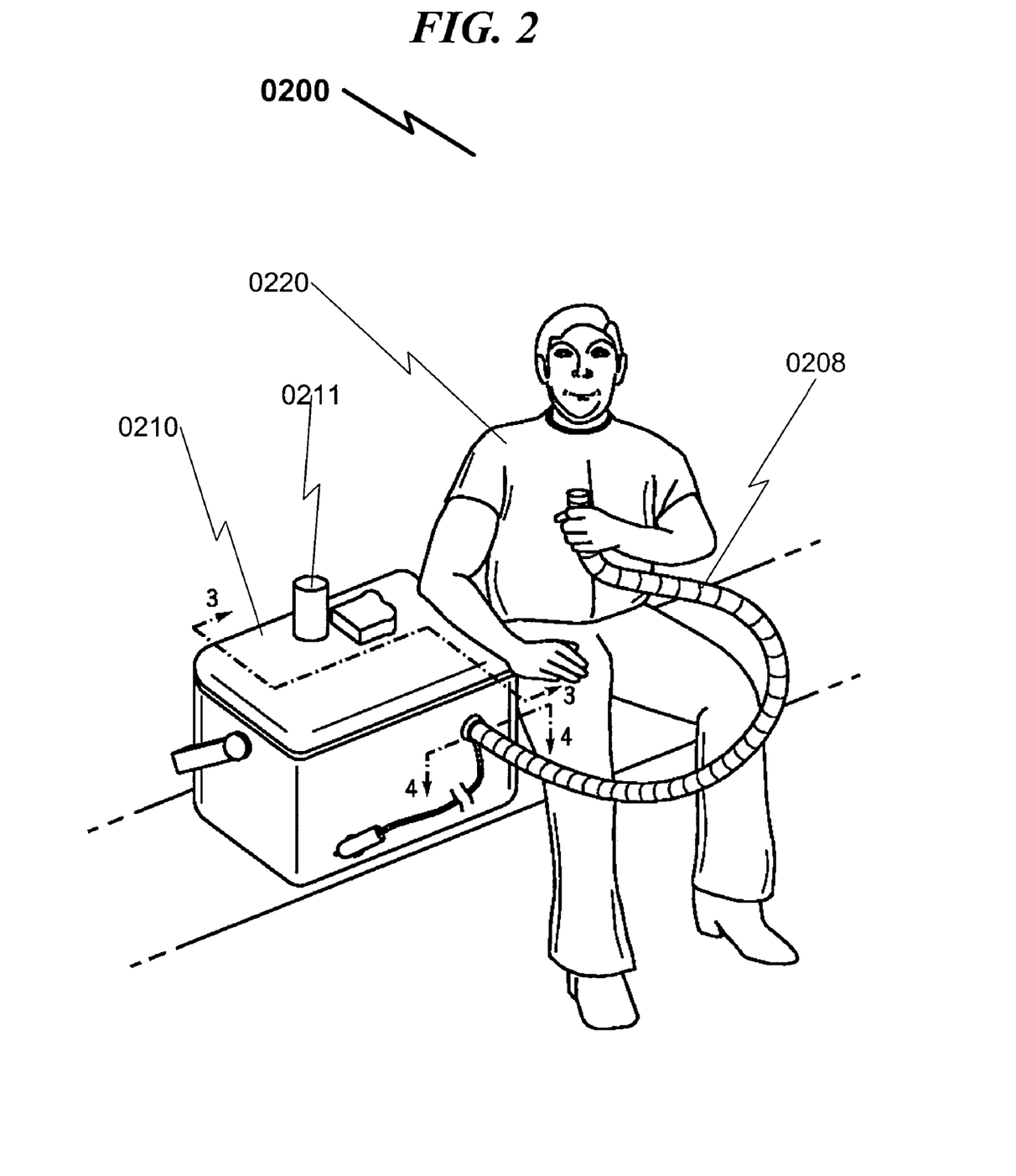
FIG. 2 illustrates a perspective view of an exemplary embodiment of the present invention illustrating an exemplary cooling application.
Figure 5:
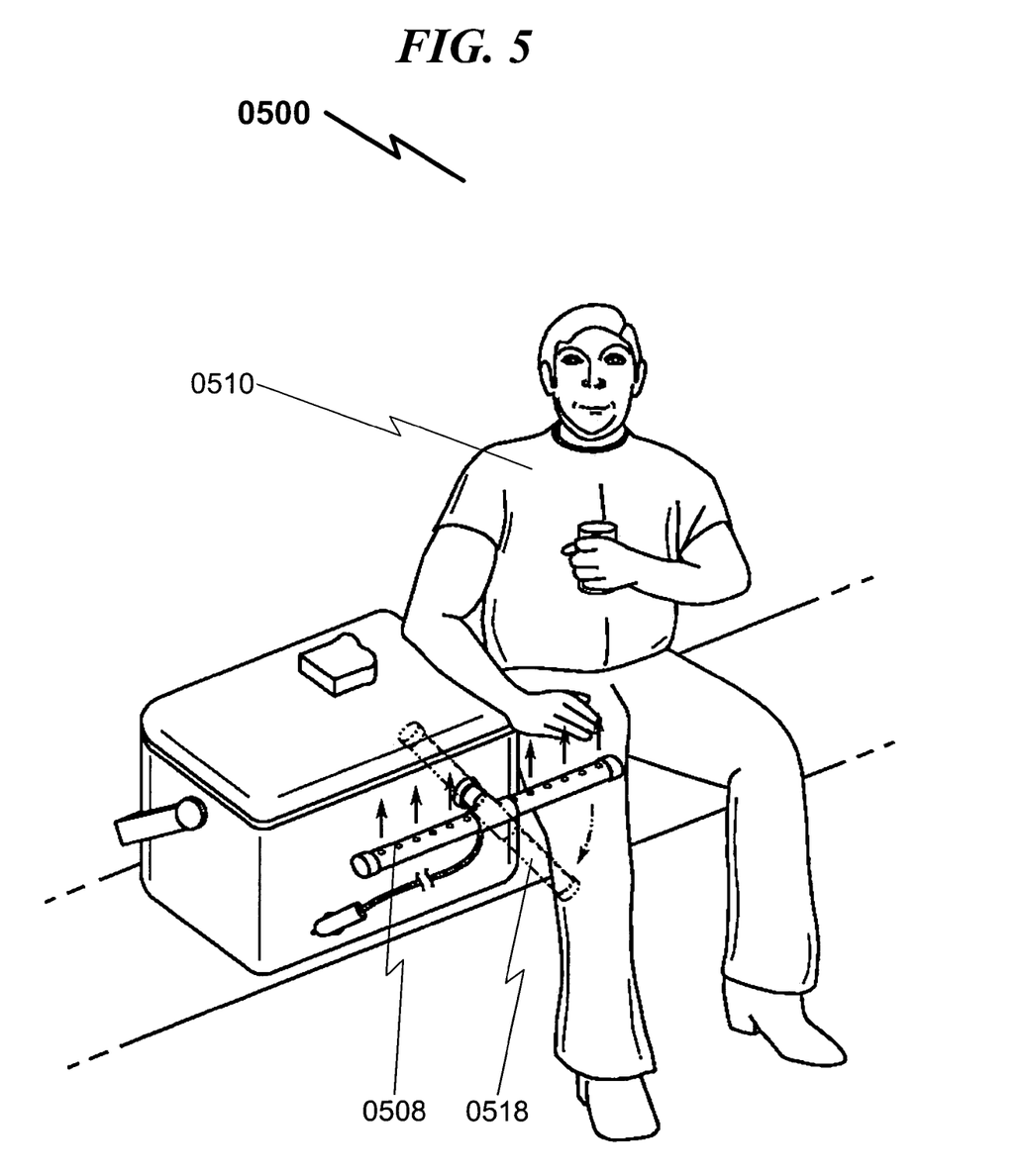
FIG. 5 illustrates a perspective view of an exemplary embodiment of the present invention illustrating an alternate exemplary cooling application.

Application of the present invention as illustrated in FIG. 2 (0200) and FIG. 5 (0500) as a portable air conditioner may also incorporate a variety of cool air dispersion devices (0208, 0508) as illustrated in these figures.

Figure 4:
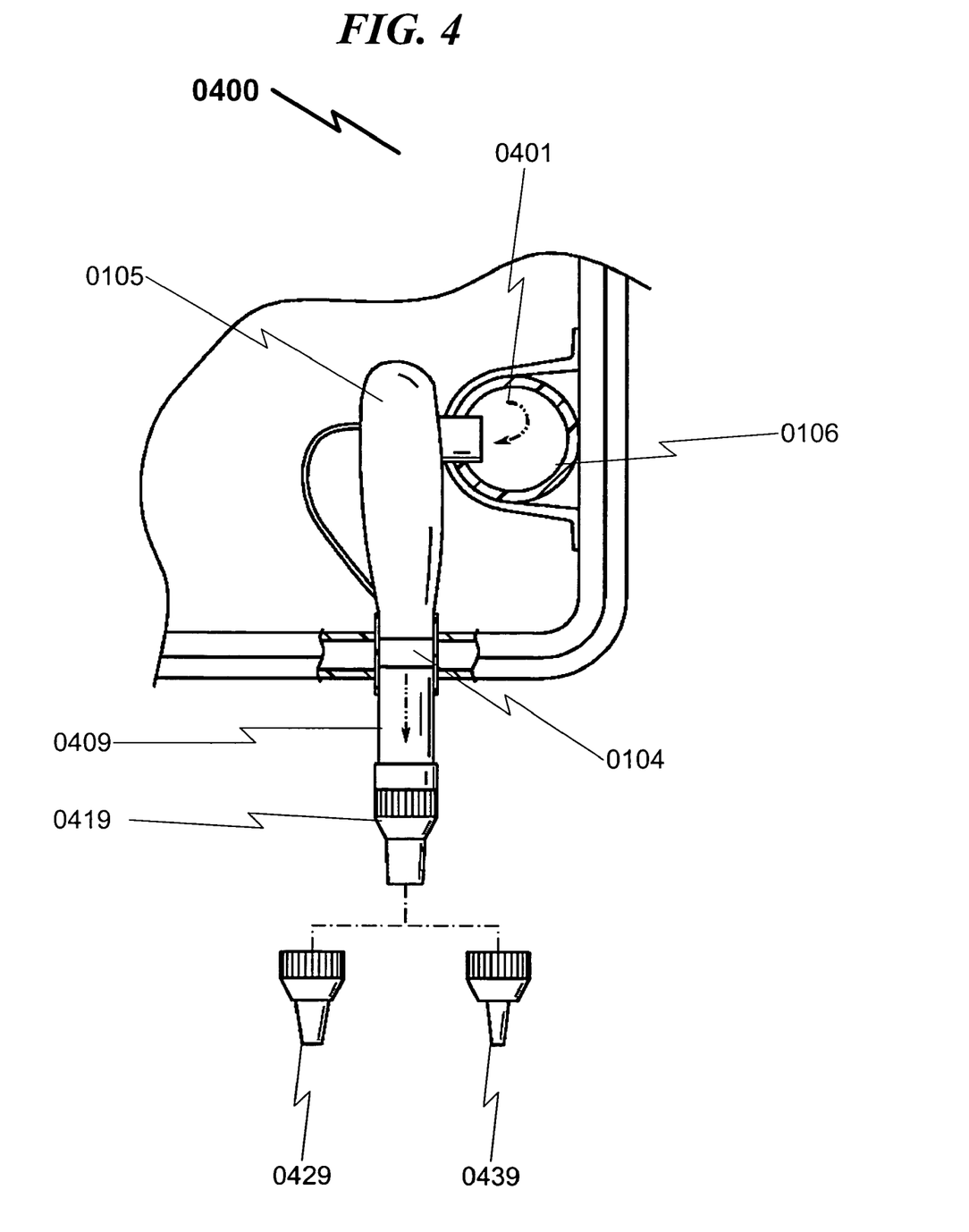
FIG. 4 illustrates a top section view of an exemplary embodiment of the present invention with detail of the blower motor, air intake for the electric blower motor, and optional air exhaust port manifolds.
Figure 6:
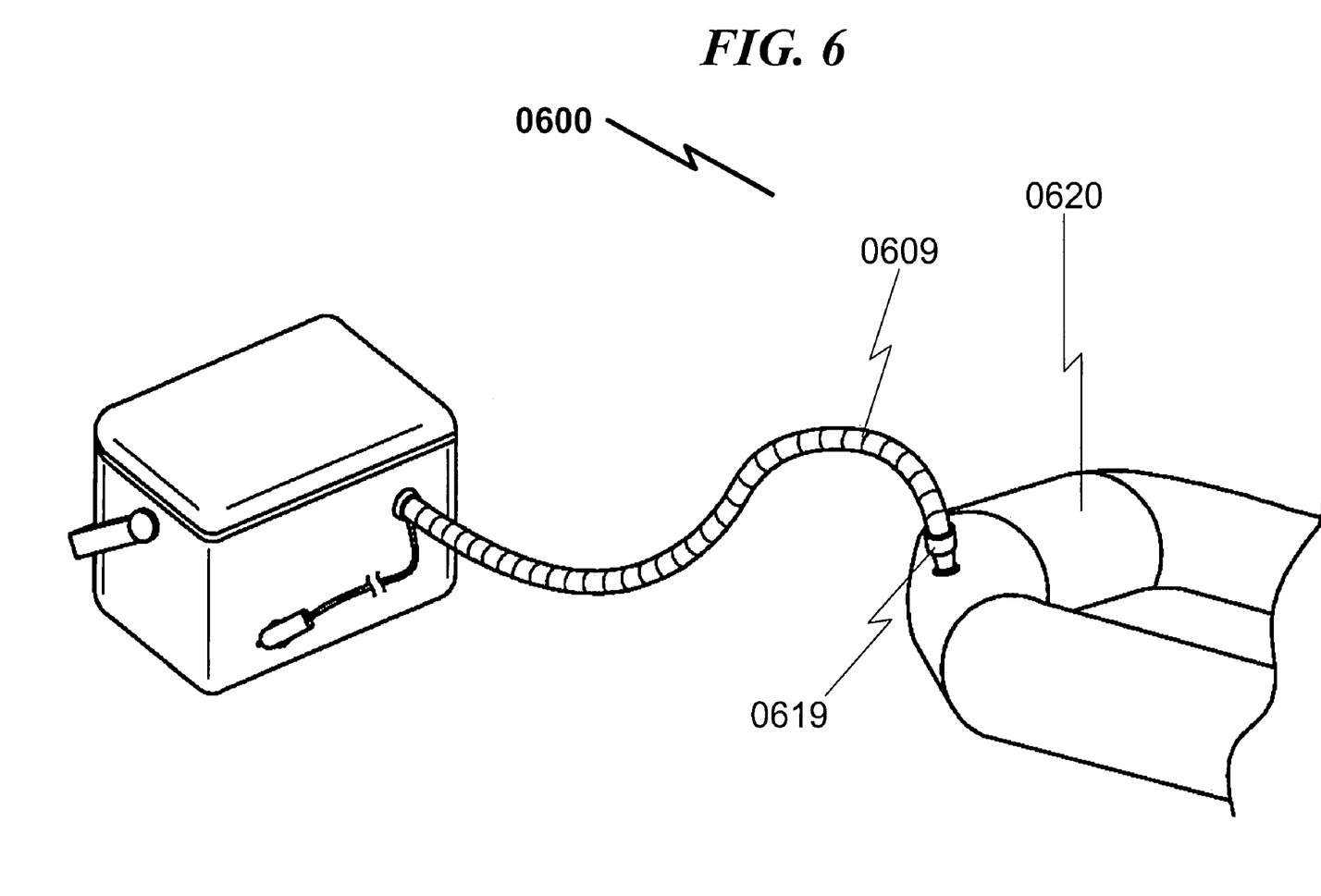
FIG. 6 illustrates a perspective view of an exemplary embodiment of the present invention illustrating the use of the system for inflating recreational floatation devices.

Application of the present invention as illustrated in FIG. 4 (0400) and FIG. 6 (0600) as a portable air inflation device may also incorporate a variety of air transport tubes/hoses (0409, 0609) as well as size-appropriate manifold inflation nozzles (0419, 0429, 0439, 0619).

BRIEF DESCRIPTION OF THE DRAWINGS

For a fuller understanding of the advantages provided by the invention, reference should be made to the following detailed description together with the accompanying drawings wherein.

DESCRIPTION OF THE PRESENTLY PREFERRED EXEMPLARY EMBODIMENTS

While this invention is susceptible of embodiment in many different forms, there is shown in the drawings and will herein be described in detailed preferred embodiment of the invention with the understanding that the present disclosure is to be considered as an exemplification of the principles of the invention and is not intended to limit the broad aspect of the invention to the embodiment illustrated.

The numerous innovative teachings of the present application will be described with particular reference to the presently preferred embodiment, wherein these innovative teachings are advantageously applied to the particular problems of a MULTIFUNCTION COOLER. However, it should be understood that this embodiment is only one example of the many advantageous uses of the innovative teachings herein. In general, statements made in the specification of the present application do not necessarily limit any of the various claimed inventions. Moreover, some statements may apply to some inventive features but not to others.

Exemplary System (0100)

The present invention preferred exemplary embodiment is generally illustrated in FIGS. 1-6 (0100, 0200, 0300, 0400, 0500, 0600) and comprises the following items as generally illustrated in FIG. 1 (0100):
  Cooler body (0101);
  Cooler lid (0102);
  Air injection port (0103) which may also comprise tubing to force air to the bottom of the cooler body;
  Air exhaust port (0104);
  Electric blower motor (0105);
  Air intake for electric blower motor (0106).

General System Application (0200)

The general system application is conceptually illustrated in FIG. 2 (0200) wherein the multifunction cooler (0210) is used to cool a person (0220) via the means of an air exhaust port adapter (0208). In this configuration the multifunction cooler can operate to refrigerate/cool foodstuffs and/or drinks (0211) while simultaneously providing cool air to the person (0220). While a wide variety of exhaust port adapters are possible with the present invention (as described herein), the FIG. 2 (0200) describes the overall concept in general.

Theory of Operation (0300, 0400)

Figure 3:
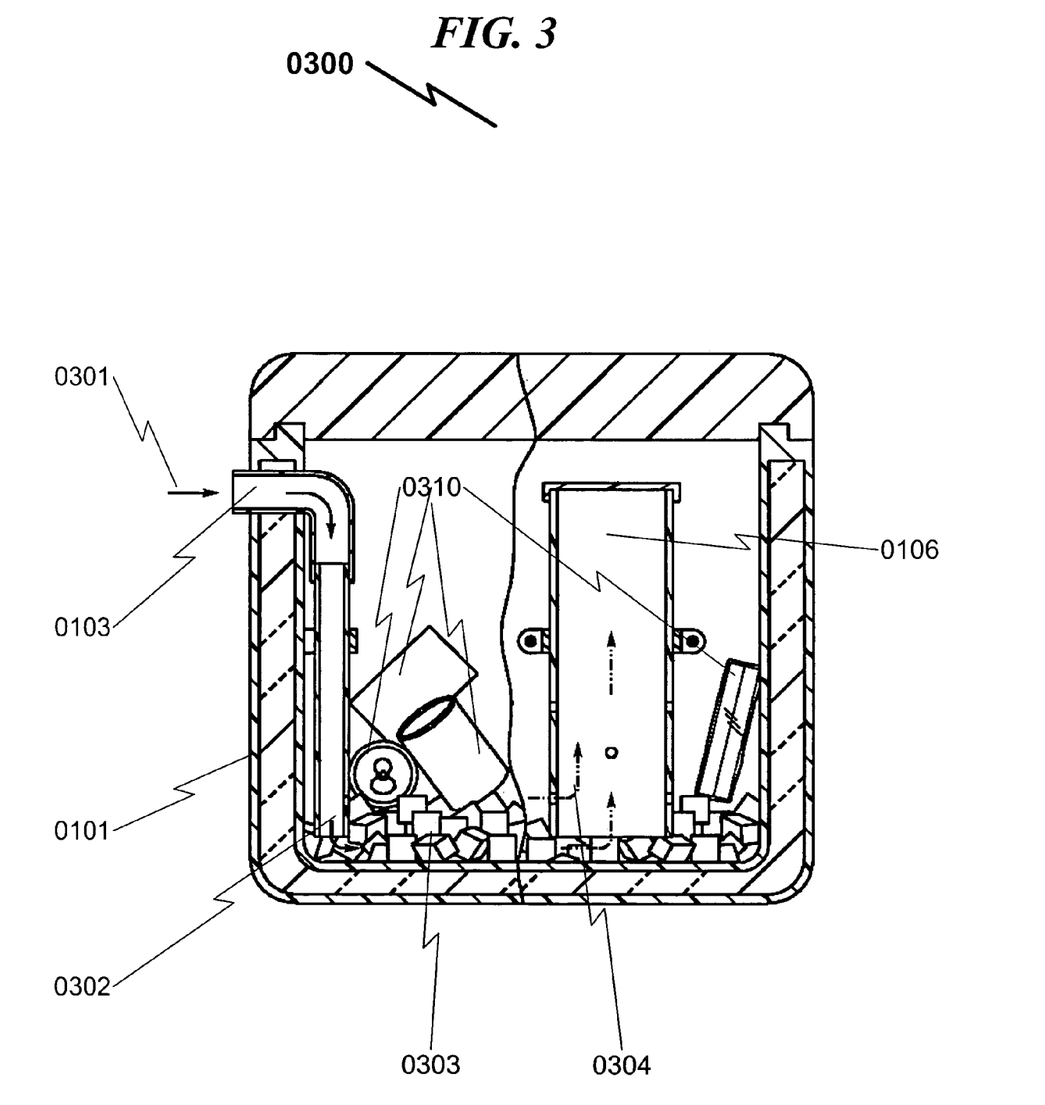
FIG. 3 illustrates a side cross section view of an exemplary embodiment of the present invention with detail of the air intake port, air intake for electric motor, and air transfer path within the system.

The general concept embodied by the invention is illustrated in FIG. 3 (0300) and FIG. 4 (0400). The system utilizes an air flow path as illustrated in FIG. 3 wherein warm ambient air (0301) is sucked into the cooler body (0101) via an air injection port (0103). This injected air is drawn to the distal end of the air injection tube at the bottom of the cooler (0302), at which point it is drawn across ice (0303) or other cold items at the bottom of the cooler. This transfer path across/through/under the ice (0303) removes heat from the ambient air.

Subsequent to this heat transfer, the air is injected (0304) into the air intake for the exhaust blower (0106), drawn through the electric blower (0105), and ejected/exhausted to the outside of the cooler as cold air. As illustrated in FIG. 4 (0400), the air traversal path (0401) is from the air intake to the exhaust blower (0106), through the blower (0105), to the air exhaust port (0104).

Key to the optimal operation of this system is having the air transfer path traverse the lower portion of the cooler. This is because any cold air residing in the cooler will reside at the bottom of the cooler. Additionally, by having the transfer path of the air forced to the bottom of the cooler, it ensures that any warm ambient outside air is forced to travel across/through any remaining ice or other cold object at the bottom of the cooler, ensuring an efficient heat transfer from the ambient air to any cold objects in the cooler.

Additionally, it should be noted that as illustrated in FIG. 1 (0100), optimal system performance is achieved by maximizing the distance between the air intake port (0103) and the air exhaust port (0104). This in many preferred embodiments may dictate that these ports are on opposite ends of the cooler, or at the diagonal ends of the cooler structure.

Performance (0200, 0300, 0500)

As illustrated in FIG. 3 (0300), the present invention makes use of an airflow path which optimizes the heat transfer from ambient air to the coolant (ice, etc.) at the bottom of the cooler. This results in amazing performance characteristics with respect to the air conditioning feature of the system. Generally, the exhaust air temperature can reach the lower range of 40° F. under many typical operating environments.

Multifunction Capability (0300)

As illustrated in FIG. 3 (0300), the present invention is capable of operating as both an air conditioning unit and a conventional cooler. The same ice (0303) or other cold object used for air conditioning purposes can be utilized to keep other foodstuffs cold, whether they be drinks, sandwiches, or other foodstuffs (0310).

This feature of the system is important from a practical sense in that it permits the system to fully function as a conventional cooler yet permit its use as an air conditioner and/or air inflation device without sacrificing any cooler functionality. This feature is not available in any configuration taught by the prior art.

Output Port Attachments (0200, 0500)

This exhaust air temperature can provide a significant degree of personal cooling when operated as illustrated in FIG. 2 (0200) with a directed hose (0208), or when operated in the preferred embodiment illustrated in FIG. 5 (0500) wherein a directional air stream is generated via use of an output port attachment (0508) having numerous holes drilled in its body. The configuration in FIG. 5 is particularly well suited to situations where the person being cooled is passively being cooled by the air stream from the present invention. Note that the output port attachment (0508) may generally be constructed of plastic tubing with capped ends and may incorporate a plethora of holes for the ejection of cooled air. This output port attachment (0508) may also be articulated (0518) within the air exhaust port (0104) to permit optimal cooling of the subject (0510).

One skilled in the art will recognize that the output port attachment examples illustrated in FIG. 2 and FIG. 5 are only examples of a wide variety of output port attachment variations that are possible which are consistent with the objective of dispersing cooled air onto the subject (0510). One skilled in the art would have no trouble in taking the teachings of the present invention and extending them to a wide variety of output port attachments, with no loss of generality in the teachings of the present invention.

Portable Air Inflation Operation (0400, 0600)

As illustrated in FIG. 4 (0400) and FIG. 6 (0600), the present invention is capable of operating as both a conventional cooler and a portable air inflation device. As Generally illustrated in FIG. 6 (0600), the blower motor contained within the system generally produces a sufficiently pressurized exhaust air stream to permit the attachment of a hose (0609) or other apparatus for connection to a air manifold/nozzle (0619) which may mate to the raft, inner tube, or other floatation device which the user desires to inflate. Note that the term "floatation device" is used generically in this document to mean any device in which air inflation is desirable. This might include a wide variety of other recreational devices not specifically listed herein.

This capability may be augmented as illustrated in FIG. 4 (0400) via the use of an air output port coupler (0409) which may mate to a variety of air manifolds/nozzles (0419, 0429, 0439) designed to mate specifically to the floatation device to be inflated (0620).

Note that this portable air inflation feature is unique to the present invention, and is particularly useful in situations where coolers are typically used, such as on boats, beaches, lakes, and around pools. Thus, the present invention permits integration of three functions that are very useful in these situations: cooling of foodstuffs, personal air conditioning, and inflation of personal floatation devices.

Exemplary Construction Materials

Construction materials for the system may vary widely, but a preferred exemplary embodiment uses the following materials:
1. Polystyrene insulated plastic box, with a hinged removable lid. A typical thermoplastic "cooler" will suffice for this purpose.
2. Inflator/deflator "Blower" (exemplary embodiment utilizes 12V, but 110V is available).
3. ½-inch to ¾-inch plumbing grade tubing.
4. 90 degree connector for ½-inch to ¾-inch plumbing grade tubing.
5. Coupling/connector for ½-inch to ¾-inch plumbing grade tubing with one end beveled to resemble a funnel shape.
6. 2-inch plumbing grade tubing.
7. 2-inch plug (knock-out) for 2-inch plumbing grade tubing.
8. Silicone or other sealant.
9. Appropriately sized U-shaped pipe mounting brackets to fasten above pipe to cooler walls.
10. Screws or other appropriate fasteners.

Note that one skilled in the art will recognize that the construction materials detailed above and the exemplary construction as detailed below can be integrated into a one or more manufacturing steps wherein the cooler body (0101), intake port (0103), exhaust port (0104), and associated internal tubing can be molded into a single unitary structure in one or more molding steps. This alternative manufacturing methodology may even include incorporation of the housing for the electric blower motor within the context of the overall molding operation.

Exemplary Construction

The following illustrates an exemplary construction methodology, which may be superseded by the use of an integrated mold construction methodology as discussed above, but nonetheless gives an exemplary working embodiment of the present invention capable of producing acceptable results in a variety of operating conditions. Construction methodology for the system may vary widely, but a preferred exemplary embodiment uses the following construction technique:

1. Begin with a polystyrene insulated plastic box with a hinged removable lid.
2. Drill a hole (approximately 1-inch to 1¾-inch in diameter) into the side of the polystyrene insulated plastic box, approximately 3-inch from hinged removable lid.
3. Drill a second hole (approximately 1-inch to 1¾-inch in diameter) into the opposite side of the polystyrene insulated plastic box, approximately 3-inch from the hinged removable lid.
4. Cut a piece of ½-inch to ¾-inch plumbing grade tubing to an approximate length of 16-inches to 20-inches. These dimensions may vary, as the length depends on the depth of the cooler. Tubing should optimally fit inside cooler 2-inches from the lid to 3-inches from the inside bottom of the cooler.
5. Cut a piece of 2-inch plumbing grade tubing to an approximate length of 16-inches to 20-inches. Length may vary as indicated above.
6. Place the 90 degree connector for ½-inch to ¾-inch plumbing grade tubing into the first hole that was drilled into the polystyrene insulated plastic box, and use Silicone or other sealant to seal the hole around the 90 degree connector for ½-inch to ¾-inch plumbing grade tubing.
7. Drill four holes (approximately ⅙-inch to ⅛-inch in diameter) into one end of the ½-inch to ¾-inch plumbing grade tubing, approximately 1-inch from one end of the ½-inch to ¾-inch plumbing grade tubing.
8. Place the end (without holes) of the ½-inch to ¾-inch plumbing grade tubing into the 90 degree connector for ½-inch to ¾-inch plumbing grade tubing, from the inside of the polystyrene insulated plastic box, then seal the two together with glue or other sealant.
9. Drill a hole, approximately 1-inch to 1¾-inch in diameter into the side of the 2-inch plumbing grade tubing, approximately 2-inches to 4-inches from one end, and then place a 2-inch plug (knock-out) for 2-inch plumbing grade into the end nearest the hole just drilled.
10. Drill several (12 to 16) holes into the 2-inch plumbing grade tubing, approximately 1/16-inch to ⅛-inch in diameter, these holes are drilled in the end opposite the 2-inch plug (knock-out), said holes drilled at random, but within 6-inches to 8-inches from the end of the 2-inch plumbing grade tubing.
11. Install an inflator/deflator "Blower" (exemplary embodiment utilizes 12V, but 110V is available) in the system as shown, and place the intake port of the inflator/deflator through the ¾-inch to 1¾-inch diameter hole that was drilled in the 2-inch plumbing grade tubing and bind them together using a screw or other fastener on the inside of the tube.
12. Place the output (blowing) port of the inflator/deflator "Blower" (exemplary embodiment utilizes 12V, but 110V is available) into the beveled end of the coupling/connector for ½-inch to ¾-inch plumbing grade tubing, then bind them together using glue or equivalent sealant.

13. Place the coupling/connector for ½-inch to ¾-inch plumbing grade tubing through the remaining hole that was drilled in the polystyrene insulated plastic box, and use Silicone or other sealant to seal from the inside of the polystyrene insulated plastic box the hole around the coupling/connector for ½-inch to ¾-inch plumbing grade tubing and screw 2-inch tubing to the cooler from inside top of tubing.
14. Place 2-inch U-shaped plastic wall mount pipe brackets onto 2-inch plumbing grade tubing just below the inflator/deflator and screw wall mount into polystyrene insulated box.
15. Place ½ to ¾-inch U-shape wall mount pipe bracket approximately 2 inches below 90° elbow and screw wall mount into polystyrene insulated box.

Alternative Construction

One skilled in the art will quickly recognize that the construction detailed above may be augmented via the use of a variety of plastic molding techniques which would reduce and/or eliminate various components by integrating them within the construction of a molded cooler interior. As such, one skilled in the art will recognize that many of the construction details may not be executed in practice, but are provided to give a complete picture of the features of the present invention and the teachings thereon.

In any construction technique, the basic concept of capturing warm outside ambient air and forcing this air into the cooler and depositing the air at the bottom of the cooler is central to the optimal construction of the present invention. Additionally, the use of opposing sides of the cooler for intake/exhaust ports and extraction of air from only the bottom 8-10 inches of the cooler (or under the ice) is central to the optimal performance of the claimed invention. This construction methodology ensures that air is forced under/through the ice at the bottom of the cooler as contrasted with just being blown over the surface of the ice or other cooling material. This technique ensures super cooled air in the range of 40° F.-50° F. and also permits use of the cooling material to keep foodstuffs and/or drinks on top of the ice cold.

Exemplary Performance

As constructed, this preferred exemplary embodiment when filled with ice and powered (exemplary embodiment utilizes 12V, but 110V is available) has the ability to produce air cooled to 40-50 degrees at the air exhaust port entrance, and 60 degrees with 4-foot hose attachment.

As constructed, this preferred exemplary embodiment is powered by a 12 volt power supply, (car cigarette lighter or equivalent 12-volt power source), but other power options are well known to those skilled in the art, including but not limited to the use of solar and 120V AC power sources. The present invention specifically anticipates that some embodiments may incorporate integral battery operation, and that some of these configurations may incorporate rechargeable batteries and/or solar powered operation.

Additionally, it should be noted that the air exiting the cooler has been filtered by the ice and water at the bottom of the cooler, with the ice water trapping dust or pollen/contaminants in the air. As such, the present invention has the added feature of an air filtration device.

System Applications

Note that the system as detailed may be used as a conventional ice chest or "cooler" as well as a portable air conditioning system by redirecting the cold air emitted from the exhaust port of the cooler air exhaust port to the person or area that desires cool air. This air exhaust port may also be redirected (via the use of constricting adapters) as a source of pressurized air for use as an air inflating device.

Thus, the present invention can be utilized in recreational and other environments (such as camping, construction equipment, emergency first responders, vehicles, etc.) where cold food/drinks are desired, portable air conditioning is desirable, and/or the availability of an air inflation device is optimal. Environments such as sporting events, fishing, boating, and general outdoor recreation are typical environments in which the benefits of this invention exceed that of the prior art.

Cooling Attachments/Output Port Attachments Not Limitive

The exemplary output port attachments illustrated in FIG. 2 (0208) and FIG. 5 (0508) should not be considered limitive of the scope of cooling attachments and/or output port attachments that are possible with the present invention. The present invention specifically anticipates that a wide variety of attachments are possible with the present system, including but not limited to the following:

Special Purpose "Cooling" Clothing. The hose attachment (0208) illustrated in FIG. 2 may have at its distal end an interface to clothing worn by the user (0220) such that the cool air exhausted by the system is forced into such clothing articles such as shirts, jackets, backpacks, hats, masks, headgear, hardhats, belts, pants, shoes, etc. An exemplary application of clothing in which the present invention could be integrated includes U.S. Pat. No. 6,260,201 which is hereby incorporated by reference. One skilled in the art will recognize that the present invention may be integrated with ANY clothing or other apparatus worn by a person in which the use of cool air aids the regulation of the person's body temperature. One skilled in the art will recognize that the hose attachments (0208, 0609) illustrated in FIG. 2 and FIG. 6 may attach at their distal end to a wide variety of clothing or personal cooling apparel, with no loss of generality in the teachings of the present invention.

Special Purpose "Cooling" Furniture. The air dispersal device (0508) may be attached to the multifunction cooler via use of a hose (0208) or other means and the dispersal device (0508) mounted on the back of a lawn chair or other article of furniture in order to provide cooling for the user. This general concept can be applied to a wide variety of chairs and other furniture which is used outside in hot environments. The present invention specifically anticipates the integration of the air dispersal device (0508) into outdoor furniture such as lawn chairs, wherein the air outflow may be directed by the reclining user to their neck or other body part via the use of an articulating arm similar to that illustrated in FIG. 5 (0500). An exemplary illustration of this class of attachments is illustrated in U.S. Pat. No. 7,059,671, which is incorporated herein by reference. One skilled in the art will recognize that the present invention may be integrated with ANY furniture or other apparatus used by a person in which the use of cool air aids the regulation of the person's body temperature. One skilled in the art will recognize that the hose attachments (0208, 0609) illustrated in FIG. 2 and FIG. 6 may attach at their distal end to a wide variety of furniture or personal cooling devices, with no loss of generality in the teachings of the present invention.

Thus, the present invention specifically anticipates that the portable air conditioning feature of the present invention may be mated to a wide variety of clothing, furniture, and/or other devices in which a supply of cool air is useful in regulating the body temperature of a person. This combined air conditioning system is enhanced due to the multifunction and portable nature of the cooler, and provides opportunities for enhanced enjoyment of outdoor activities during periods of increased ambient temperature and/or humidity. It should also be noted that in some circumstances the integration of the multifunction air conditioning system in the present invention with an article of clothing and/or furniture may permit persons who are overheated to reduce their body temperature so as to prevent heat exhaustion and/or heat stroke.

Dimensions are Exemplary

The exemplary construction detailed herein may be widely varied as to dimensions. Therefore, the exemplary construction dimensions detailed herein are for illustration purposes only and are not to be interpreted as limiting the scope of the claimed invention.

Ice Not Limitive

The foregoing description has indicated the use of ice as the cooling agent within the context of the cooler system, but the invention specifically anticipates the use of "cold packs" or other materials which are either cooled or frozen, but which may not contain water as their primary component. Therefore, the term "ice" when used herein should be broadly interpreted to mean any cooling agent capable of extracting heat from the ambient air.

System Variations

The present invention anticipates a wide variety of variations in the basic theme of construction. The examples presented previously do not represent the entire scope of possible usages. They are meant to cite a few of the almost limitless possibilities.

Method Variations

The present invention may incorporate a method of using the system as described in an application wherein a multifunction cooler is utilized as a portable personal air conditioner. This method may be generally described as follows:

A method of operating a cooler, the cooler comprising a cooler body, cooler lid covering the cooler body, air injection port fixed on the cooler body to permit air outside of the cooler to enter and be forced to the bottom of the cooler body where it becomes chilled air, air exhaust port fixed on the cooler body to permit air inside of the cooler body to exhaust the cooler body, blower motor connected to the air exhaust port, the method comprising:
(1) placing ice in the cooler body;
(2) activating the blower motor to permit air at ambient temperatures to enter the cooler body, pass through the ice at the bottom of the cooler body, and exit through the air exhaust port.

This method may be augmented and/or modified as follows in some preferred exemplary embodiments:

The blower motor operates on 12V DC.
The air injection port and the air exhaust port are on opposite sides of the cooler body.
The air injection port forces the outside air to the bottom 8-10 inches of the cooler body.
The blower motor draws the chilled air from the bottom 8-10 inches of the cooler body.
The cooler further comprises an output port attachment connected to the air exhaust port, wherein the output port attachment further comprises a plethora of holes to exhaust cool air on a person, the connection between the output port attachment and the air exhaust port capable of articulation to permit directionality of the exhausted cool air.
The air exhaust port further comprises a hose connecting the air exhaust port to an article of clothing, the clothing receiving the chilled air from the hose for the purposes of cooling a person wearing the clothing.
The air exhaust port further comprises a hose connecting the air exhaust port to an article of furniture, the article of furniture receiving the chilled air from the hose for the purposes of cooling a person using the furniture.

CONCLUSION

A MULTIFUNCTION COOLER has been disclosed that permits a single portable cooler to simultaneously operate as a conventional portable refrigeration device, a personal air conditioner, and a portable air inflation device. The disclosed cooler incorporates an air injection port that permits warm air external to the cooler to be forced through ice or other coolant material inside the cooler. The air injection is facilitated by an electric air blower or other fan apparatus which vents air from within the coldest portions of the interior of the cooler confines to an exhaust port which may be used as a source of air conditioning or alternatively as an air inflation device.

Although a preferred embodiment of the present invention has been illustrated in the accompanying drawings and described in the foregoing Detailed Description, it will be understood that the invention is not limited to the embodiments disclosed, but is capable of numerous rearrangements, modifications, and substitutions without departing from the spirit of the invention as set forth and defined by the following claims.

What is claimed is:

1. A multifunction cooler comprising:
(a) cooler body;
(b) cooler lid covering said cooler body;
(c) air injection port fixed on said cooler body to permit air outside of said cooler to enter said cooler body and be forced to the bottom of said cooler body;
(d) air exhaust port fixed on said cooler body to permit air inside of said cooler to exhaust said cooler body;
(e) blower motor connected to said air exhaust port;
(f) an output port attachment connected to said air exhaust port, wherein said output port attachment further comprises a plethora of holes to exhaust cool air on a person, said connection between said output port attachment and said air exhaust port capable of articulation to permit directionality of said exhausted cool air;
wherein
said air injection port permits warm ambient air outside of said cooler body to be chilled by the contents of said cooler body to form chilled air within said cooler body;
said blower motor draws said chilled air from the bottom of said cooler body and exhausts said chilled air through said air exhaust port;

said air exhaust port may be utilized as a portable source of refrigerated air;

said air exhaust port may alternatively be utilized as an air inflation device.

2. A multifunction cooler comprising:
(a) cooler body;
(b) cooler lid covering said cooler body;
(c) air injection port fixed on said cooler body to permit air outside of said cooler to enter said cooler body and be forced to the bottom of said cooler body;
(d) air exhaust port fixed on said cooler body to permit air inside of said cooler to exhaust said cooler body;
(e) blower motor connected to said air exhaust port;
(f) a hose connecting said air exhaust port to an article of clothing, said clothing receiving said chilled air from said hose for the purposes of cooling a person wearing said clothing;
wherein
said air injection port permits warm ambient air outside of said cooler body to be chilled by the contents of said cooler body to form chilled air within said cooler body;
said blower motor draws said chilled air from the bottom of said cooler body and exhausts said chilled air through said air exhaust port;
said air exhaust port may be utilized as a portable source of refrigerated air;
said air exhaust port may alternatively be utilized as an air inflation device.

3. A multifunction cooler comprising:
(a) cooler body;
(b) cooler lid covering said cooler body;
(c) air injection port fixed on said cooler body to permit air outside of said cooler to enter said cooler body and be forced to the bottom of said cooler body;
(d) air exhaust port fixed on said cooler body to permit air inside of said cooler to exhaust said cooler body;
(e) blower motor connected to said air exhaust port;
(f) a hose connecting said air exhaust port to an article of furniture, said article of furniture receiving said chilled air from said hose for the purposes of cooling a person using said furniture;
wherein
said air injection port permits warm ambient air outside of said cooler body to be chilled by the contents of said cooler body to form chilled air within said cooler body;
said blower motor draws said chilled air from the bottom of said cooler body and exhausts said chilled air through said air exhaust port;
said air exhaust port may be utilized as a portable source of refrigerated air;
said air exhaust port may alternatively be utilized as an air inflation device.

4. A method of operating a cooler, said cooler comprising a cooler body, cooler lid covering said cooler body, air injection port fixed on said cooler body to permit air outside of said cooler to enter and be forced to the bottom of said cooler body where it becomes chilled air, air exhaust port fixed on said cooler body to permit air inside of said cooler body to exhaust said cooler body, blower motor connected to said air exhaust port, said method comprising:
(1) placing ice in said cooler body;
(2) activating said blower motor to permit air at ambient temperatures to enter said cooler body, pass through said ice at the bottom of said cooler body, and exit through said air exhaust port;
wherein said cooler further comprises an output port attachment connected to said air exhaust port, wherein said output port attachment further comprises a plethora of holes to exhaust cool air on a person, said connection between said output port attachment and said air exhaust port capable of articulation to permit directionality of said exhausted cool air.

5. A method of operating a cooler, said cooler comprising a cooler body, cooler lid covering said cooler body, air injection port fixed on said cooler body to permit air outside of said cooler to enter and be forced to the bottom of said cooler body where it becomes chilled air, air exhaust port fixed on said cooler body to permit air inside of said cooler body to exhaust said cooler body, blower motor connected to said air exhaust port, said method comprising:
(1) placing ice in said cooler body;
(2) activating said blower motor to permit air at ambient temperatures to enter said cooler body, pass through said ice at the bottom of said cooler body, and exit through said air exhaust port;
wherein said air exhaust port further comprises a hose connecting said air exhaust port to an article of clothing, said clothing receiving said chilled air from said hose for the purposes of cooling a person wearing said clothing.

6. A method of operating a cooler, said cooler comprising a cooler body, cooler lid covering said cooler body, air injection port fixed on said cooler body to permit air outside of said cooler to enter and be forced to the bottom of said cooler body where it becomes chilled air, air exhaust port fixed on said cooler body to permit air inside of said cooler body to exhaust said cooler body, blower motor connected to said air exhaust port, said method comprising:
(1) placing ice in said cooler body;
(2) activating said blower motor to permit air at ambient temperatures to enter said cooler body, pass through said ice at the bottom of said cooler body, and exit through said air exhaust port;
wherein said air exhaust port further comprises a hose connecting said air exhaust port to an article of furniture, said article of furniture receiving said chilled air from said hose for the purposes of cooling a person using said furniture.

* * * * *